Feb. 1, 1927.

W. J. HARDY 1,616,367

ACCELERATOR PEDAL

Filed June 28, 1926

INVENTO.
W. J. Hardy.
By William C. Linton
Atty.

Patented Feb. 1, 1927.

1,616,367

UNITED STATES PATENT OFFICE.

WILLIAM JAMES HARDY, OF AUBURN, NEAR SYDNEY, NEW SOUTH WALES, AUSTRALIA.

ACCELERATOR PEDAL.

Application filed June 28, 1926, Serial No. 119,133, and in Australia May 20, 1926.

This invention refers to the accelerator pedals of automobiles, the unintentional operation of which has resulted in fatal and other accidents, and the improvements have been specially devised to provide simple, cheap, handy and effective means whereby the accelerator pedal or lever when freed to retire to normal inoperative position will be locked against operation until deliberately released, thus preventing unintentional operation thereof.

The improvements consist of a normally projected retirable latch arranged to engage and lock the accelerator pedal or lever, and operable means for freeing the latch from the pedal to allow operation of the latter.

In order that the improvements and a practical application thereof will be readily understood the same will be described with reference to the accompanying drawings which illustrate a convenient construction and arrangement, and in which:—

Figure 1:
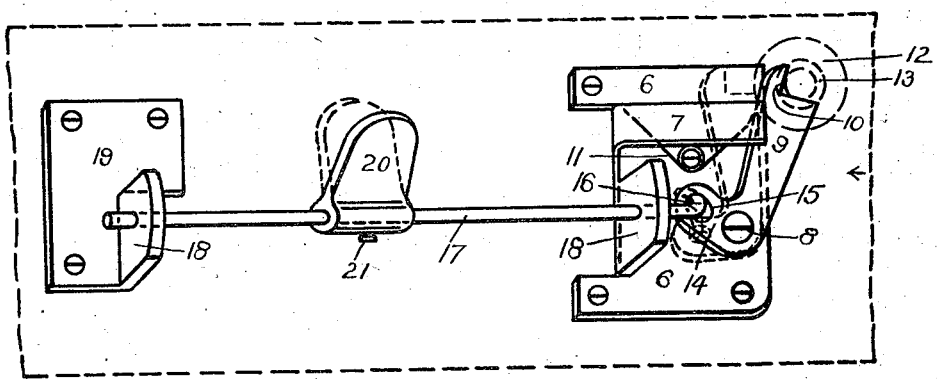
Figure 1 is a perspective view of the improvements arranged for use.
Figure 2:
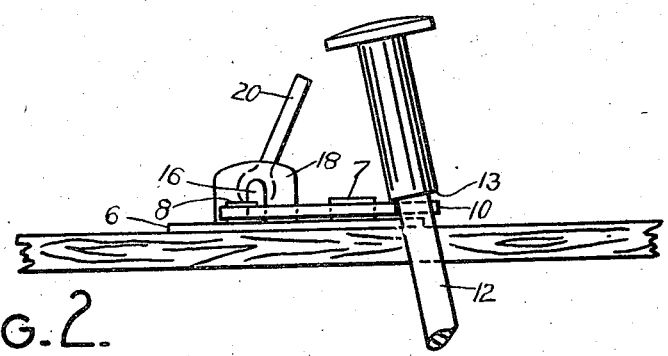
Figure 2 is an end elevation partly in section viewed in direction of the arrow in Figure 1.

On a bracket 6 which carries a spaced guard 7 thereabove and is adapted to be secured to the floor of the vehicle close to the accelerator pedal or lever, is pivoted as at 8 a bellcrank whose long member functions as a latch 9, has on its end an inward shoulder 10, and moves between the bracket 6 and its guard 7 against a compressible spring 11 which is conveniently secured and keeps said latch normally projected beyond the edge of said bracket with its shoulder 10 riding against the stem of the pedal 12, and the other member 14 of the bellcrank is orificed as at 15 to receive the cranked end 16 of a rocker shaft 17 which latter is mounted in an upstanding lug 18 on said bracket 6 and in a similar lug 18 on another bracket 19 adapted to be secured to the floor of the vehicle at requisite position. On said shaft 17 is a pedal 20 preferably secured by a setscrew 21 to permit of longitudinal and radial adjustment of said pedal 20 to suit the driver.

A descendable accelerator pedal 12 is provided with an engageable shoulder 13 formed by thickening the stem from requisite position to, or near to, its head so that when the pedal 12 commences to descend, the shoulder 13 passes the latch 9 whose edge will then ride against the thickened stem during operation of said pedal, but immediately the pedal is allowed to rise to its highest or shut off position, the latch 9 will pass under the shoulder 13 and lock the pedal against operation until the latch is deliberately retired therefrom through operation of the rocker shaft 17 by pressure of a foot upon its pedal 20.

In applying the improvements to existing vehicles in which the accelerator pedal is descendable, the requisite engageable shoulder 13 may be provided on the pedal stem 12 by affixing thereon a sleeve of requisite length.

The latch may be projected by a spring as described or by any other suitable means.

Figure 3:
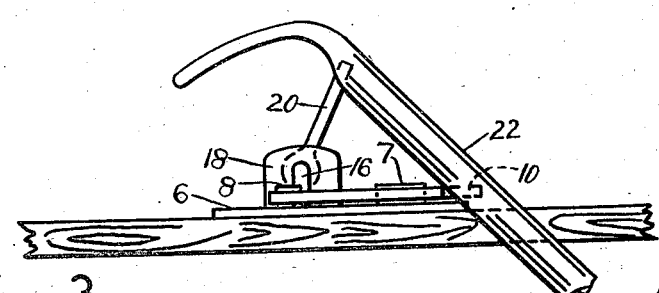
Figure 3 is a similar view showing the improvements applied to an oscillatable accelerator pedal.

With an oscillatable accelerator pedal 22 the latch is arranged as in Figure 3, so that the end thereof will pass in front of the pedal stem when it is in retired or shut off position and lock it thereat, the inward shoulder 10 of the latch riding against said stem to prevent excessive projection of the latch. When the latch 9 is retired and the pedal 22 is moved its stem passes the end of the latch 9 whose side rides freely against said stem until the pedal 22 is freed and returns to normal position when the latch end will pass in front of the stem and so lock the pedal.

In use, the accelerator pedal being in highest, retired or shut off position, the latch is in front of an oscillatable pedal 22 or under the shoulder 13 on a descendable pedal 12, the shoulder 10 of the latch 9 riding against the pedal stem 12 or 22, and so preventing excessive projection of said latch, and the accelerator pedal is locked. When it is desired to operate such pedal the latch 9 is retired therefrom by operation of the rocker shaft 17 as described, and immediately said pedal is operated the latch 9 is held disengaged therefrom during all movement thereof, but immediately the pedal is allowed to return to normal position it is engaged by the latch and locked.

What I claim is:—

1. A latch for an accelerator pedal of automobiles comprising means for normally retaining the pedal in an inoperative position, means for releasing said retaining means and means carried by the pedal for holding said retaining means in an inoperative position after said means for releasing the retaining means has been operated.

2. A latch for an accelerator pedal of automobiles comprising a lever adapted to engage the pedal for retaining the latter in its normal position, means operatively connected to said lever whereby the same may be withdrawn from engagement with the pedal and means for holding said lever out of retaining engagement with the pedal when the same has been moved to a functioning position.

3. A device for retaining an accelerator pedal of automobiles in an inoperative position comprising a pivotally supported member, a shoulder formed with said member and adapted to normally engage the pedal for retaining the latter in an inoperative position, a projection carried by the pedal, said shoulder adapted to ride upon said projection when the pedal is in operative position and a manually operable shaft connected to said member whereby said shoulder may be moved from engagement with the pedal and permitted to ride upon said projection.

4. The combination with a descendable accelerator pedal of an automobile, of a shoulder at requisite position on the pedal stem formed by thickening same thereabove, a bracket secured to the floor, a bellcrank member fulcrumed upon said bracket and having an inwardly shouldered end and an orificed end, means for normally projecting the shouldered end, a rocker shaft with a cranked end in engagement with said orificed end, and a pedal upon said shaft.

5. The combination with an automobile accelerator pedal having a stem provided with a reduced portion, of means for locking said pedal in an inoperative position comprising a bracket, a bell crank lever pivotally mounted upon said bracket, a latch arm formed with one end of said lever and adapted to engage the reduced portion of the stem of the pedal for retaining the latter in an inoperative position, a crank shaft journalled to said bracket and connected to the opposite end of said bell crank lever, an adjustable and manually operable pedal carried by said crank shaft, and means for normally holding said latch arm in contact with the stem of the accelerator pedal.

6. An improved rockable lock for an automobile accelerator pedal, comprising a bracket, a bell crank carried thereby, one arm of which has an inward shoulder at its ends to provide a latch and the other arm formed with an opening, means to normally project the latch, a rockable shaft mounted in said bracket, a crank at one end of said shaft engageable with the opening in said arm and a longitudinally and radially adjustable pedal upon said shaft.

7. An improved operable lock for an automobile accelerator pedal, comprising a bracket which is adapted for affixing to the floor of the vehicle and has a spaced guard thereabove and open to one side thereof, and an upstanding bearing lug, a bell crank pivoted upon said bracket, and having one member orificed and the other inwardly shouldered and movable between the bracket and the guard, a spring secured to said bracket to normally project the shouldered member, a rockable shaft mountable in said lug, a crank at one end of said shaft for engagement with the orificed end of the bellcrank, and a longitudinally and radially adjustable pedal upon said shaft.

WILLIAM JAMES HARDY.